(12) United States Patent
Kim et al.

(10) Patent No.: US 10,389,042 B2
(45) Date of Patent: Aug. 20, 2019

(54) V2X ANTENNA AND V2X ANTENNA SYSTEM INCLUDING THE SAME

(71) Applicants: HYUNDAI MOTOR COMPANY, Seoul (KR); KIA MOTORS CORPORATION, Seoul (KR); INFAC ELECS CO., LTD, Suwon-si, Gyeonggi-do (KR)

(72) Inventors: Yong Ho Kim, Gunpo-si (KR); Hyeon Je Son, Hwaseong-si (KR); Jin Kyu Hwang, Incheon (KR); Sang Hoon Lim, Ansan-si (KR); Tae Hoon Yang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/827,481

(22) Filed: Nov. 30, 2017

(65) Prior Publication Data
US 2018/0366838 A1    Dec. 20, 2018

(30) Foreign Application Priority Data
Jun. 20, 2017    (KR) .......................... 10-2017-0078004

(51) Int. Cl.
*H01Q 21/28*    (2006.01)
*H01Q 1/12*    (2006.01)
(Continued)

(52) U.S. Cl.
CPC ........... *H01Q 21/28* (2013.01); *H01Q 1/3266* (2013.01); *H01Q 1/3275* (2013.01);
(Continued)

(58) Field of Classification Search
CPC .... H01Q 21/28; H01Q 1/3275; H01Q 1/3266; H01Q 5/307
(Continued)

(56) References Cited

U.S. PATENT DOCUMENTS 6,271,798 B1 *   8/2001   Endo ...................... G01S 19/36
                                                              342/70
7,742,004 B2 *   6/2010   Fukushima ............ H01Q 19/30
                                                              343/702

(Continued)

FOREIGN PATENT DOCUMENTS

JP      2004304542 A    10/2004
JP      2011160339 A    8/2011
KR    10-2010-0056683    5/2010

*Primary Examiner* — Lam T Mai
(74) *Attorney, Agent, or Firm* — Brinks Gilson & Lione (57) ABSTRACT

The present disclosure provides a V2X antenna and a V2X antenna system. The V2X (Vehicle-to-Everything) antenna system includes: a first antenna arranged in a front surface of an interior of a vehicle, wherein the first antenna is configured to communicate at least one of a V2X signal or an LTE (Long Term Evolution) signal; a second antenna arranged in a rear surface of a roof of the vehicle, wherein the second antenna is configured to communicate at least one of the V2X signal or the LTE signal; and a tuner module configured to perform diversity communication in response to at least one of the V2X signal or the LTE signal received from the first antenna and the second antenna.

25 Claims, 6 Drawing Sheets

(51) Int. Cl.
*H01Q 1/32* (2006.01)
*H01Q 5/307* (2015.01)
*H04W 4/70* (2018.01)
*G01S 19/01* (2010.01)
*H04W 4/04* (2009.01)
*H04W 72/12* (2009.01)
*H04W 72/02* (2009.01)

(52) U.S. Cl.
CPC ............ *H01Q 1/3291* (2013.01); *H01Q 5/307* (2015.01); *H04W 4/70* (2018.02); *G01S 19/01* (2013.01); *H01Q 1/1271* (2013.01); *H04W 4/046* (2013.01); *H04W 72/02* (2013.01); *H04W 72/1215* (2013.01)

(58) Field of Classification Search
USPC .......................................... 343/713, 702, 70
See application file for complete search history.

(56) References Cited

U.S. PATENT DOCUMENTS

| | | | |
|---|---|---|---|
| 7,936,852 B2* | 5/2011 | Lindenmeier | H04B 7/0814 |
| | | | 375/347 |
| 9,685,695 B2* | 6/2017 | Sugimoto | H01Q 1/3275 |
| 9,800,354 B2* | 10/2017 | Suzuki | H04B 1/525 |
| 10,044,418 B2* | 8/2018 | Fikar | H04B 7/15507 |
| 2001/0033249 A1 | 10/2001 | Endo et al. | |
| 2007/0058761 A1 | 3/2007 | Lindenmeier | |
| 2008/0291097 A1 | 11/2008 | Fukushima et al. | |
| 2015/0097738 A1 | 4/2015 | Sugimoto et al. | |
| 2015/0099475 A1 | 4/2015 | Suzuki et al. | |
| 2016/0344088 A1* | 11/2016 | Takeuchi | H01Q 1/1271 |
| 2017/0047962 A1* | 2/2017 | Gururaj | H04B 1/44 |
| 2017/0054204 A1* | 2/2017 | Changalvala | H01Q 1/3291 |
| 2017/0346174 A1* | 11/2017 | Yang | H01Q 5/371 |

* cited by examiner

V2X ANTENNA AND V2X ANTENNA SYSTEM INCLUDING THE SAME

CROSS-REFERENCE TO RELATED APPLICATION

The present application claims priority to and the benefit of Korean Patent Application No. 10-2017-0078004, filed on Jun. 20, 2017, which is incorporated herein by reference in its entirety.

FIELD

The present disclosure relates to a V2X (Vehicle-to-everything) antenna and a V2X antenna system including the same, and more particularly to a system for constructing a diversity antenna using a first antenna embedded in a vehicle and a second antenna mounted on a roof of the vehicle.

BACKGROUND

The statements in this section merely provide background information related to the present disclosure and may not constitute prior art.

A Vehicle-to-Everything (V2X) communication system is a communication system capable of supporting Vehicle-to-Vehicle (V2V) communication and Vehicle-to-Infrastructure (V2I) communication. The V2X communication system may inform a driver of a vehicle of a dangerous situation, which may be encountered in a front region from the driver's vehicle, when traveling on a road such as an expressway or a general road, or may inform another vehicle, which is located in a rear region from the driver's vehicle, of the dangerous situation through V2I communication so as to reduce the number of traffic accidents.

In a conventional V2X communication system, a plurality of V2X antennas is arranged on the roof of the vehicle such that the plurality of V2X antennas had only one directivity. As a result, the conventional V2X communication system may be inappropriate for the antenna direction in the V2V communication.

SUMMARY

The present disclosure is directed to a V2X antenna and a V2X antenna system including the same that substantially reduce one or more inefficiencies of the conventional system.

The present disclosure provides a V2X antenna in which a first antenna and a second antenna are arranged to be appropriate for V2V and V2I communication such that the V2X antenna is appropriate for V2V and V2I communication, and a V2X antenna system including the same.

In some forms of the present disclosure, a V2X (Vehicle-to-Everything) antenna includes: a first antenna arranged in a front surface of an interior of a vehicle, wherein the first antenna is configured to communicate at least one of a V2X signal or an LTE (Long Term Evolution) signal; and a second antenna arranged in a rear surface of a roof of the vehicle, wherein the second antenna is configured to communicate at least one of the V2X signal or the LTE signal.

The second antenna may be configured to receive at least one of an AM (Amplitude Modulation)/FM (frequency modulation) signal, a Digital Multimedia Broadcasting (DMB) signal, or a Global Positioning System (GPS) signal.

The first antenna may have directivity, and may be configured to cover a signal generated from a front region of the vehicle.

When the first antenna transmits at least one of the V2X signal or the LTE signal, the first antenna may have a directional angle formed in an upward direction and in a parallel direction of the vehicle.

The first antenna may have a directional angle of $-30°$ to $0°$.

The second antenna may have directivity, and may be configured to cover a signal generated from a rear region of the vehicle.

When the second antenna transmits at least one of the V2X signal or the LTE signal, the second antenna may have a directional angle formed in the upward direction and in the parallel direction of the vehicle.

The second antenna may have a directional angle of $0°$ to $-60°$.

A directivity of the first antenna may be different from the directivity of the second antenna, and the directivity of the first antenna is dualized.

The first antenna may be arranged on at least one of a windshield or a crash pad of the vehicle.

When the vehicle is a sedan, the first antenna may have a predetermined directional angle, and may be arranged on the windshield of the vehicle.

When the first antenna is arranged on the windshield of the vehicle, the directivity of the first antenna may include a front-upper direction, a front-parallel direction, and a rear-parallel direction.

The windshield may include a position of at least one of a rear upper end of a cluster of the vehicle, a part disposed between the cluster and a head unit, or an upper end of the head unit.

When the vehicle is a Sport Utility Vehicle (SUV), the first antenna may have a predetermined directional angle, and may be arranged on the crash pad of the vehicle.

When the first antenna is arranged on the crash pad of the vehicle, the directivity of the first antenna may include the front-upper direction, the front-parallel direction, and the rear-parallel direction.

The second antenna may include at least one of a shark-fin antenna or a micro-pole antenna.

In other forms of the present disclosure, a V2X (Vehicle-to-Everything) antenna system includes: a first antenna arranged in a front surface of an interior of a vehicle, wherein the first antenna is configured to communicate at least one of a V2X signal or an LTE (Long Term Evolution) signal; a second antenna arranged in a rear surface of a roof of the vehicle, wherein the second antenna is configured to communicate at least one of the V2X signal or the LTE signal; and a tuner module configured to perform diversity communication in response to at least one of the V2X signal or the LTE signal received from the first antenna and the second antenna.

The tuner module may include: a splitter configured to distinguish between reception signals of the first antenna and the second antenna; an LTE modem configured to receive the LTE signal from the reception signals of the first antenna and the second antenna; and a V2X modem configured to receive the V2X signal from the reception signals of the first antenna and the second antenna.

The tuner module may be configured to determine reception rates of the LTE and V2X signals of the first antenna and the reception rates of the LTE and V2X signals of the second antenna on a real time basis.

The tuner module may be configured to adjust a directional angle of at least one of the first antenna or the second antenna to a direction having the highest reception rate of the LTE signal and the V2X signal.

When a directional angle of any one of the first antenna or the second antenna is adjusted in the direction having the high reception rate of the LTE signal and the V2X signal, a directional angle of the other antenna may be adjusted in a direction having a wide coverage of the remaining parts.

The tuner module may be configured to independently adjust the directional angle of each of the first antenna and the second antenna.

When the first antenna is arranged on at least one of a windshield or a crash pad of the vehicle, the tuner module may be configured to perform diversity communication in response to the LTE signal and the V2X signal.

When the first antenna is arranged on the windshield of the vehicle and the first and second antennas perform Vehicle-to-Vehicle (V2V) communication, the tuner module may be configured to select a signal having a higher reception rate from V2V signals respectively received from the first antenna and the second antenna.

When the first antenna is arranged in the vicinity of the windshield and performs Vehicle-to-Infrastructure (V2I) communication with a peripheral vehicle, the tuner module may be configured to select a signal having a higher reception rate from V2I signals respectively received from the first antenna and the second antenna.

When the first antenna is arranged on the crash pad of the vehicle and performs Vehicle-to-Vehicle (V2V) communication with a peripheral vehicle, the tuner module may be configured to select the signal having the higher reception rate from the V2V signals respectively received from the first antenna and the second antenna.

When the first antenna is arranged on the crash pad of the vehicle and performs Vehicle-to-Infrastructure (V2I) communication with the peripheral vehicle, the tuner module may be configured to select the signal having the higher reception rate from the V2I signals respectively received from the first antenna and the second antenna.

The tuner module may perform diversity communication to reduce the influence of fading such as irregular variation of a communication electric field of each of the first and second antennas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an apparatus and method in some forms of the present disclosure will be described with reference to the accompanying drawings. In the following description, suffixes "module" and "unit" contained in terms of constituent elements to be described will be selected or used together in consideration only of the convenience of writing the following specification, and the suffixes "module" and "unit" do not necessarily have different meanings or roles.

In the following description, assuming that a certain object is formed above (over) or below (beneath) the respective constituent elements, this means that two constituent elements are brought into direct contact with each other, or one or more constituent elements are disposed and formed between two constituent elements. In addition, assuming that a certain object is formed over or below the respective constituent elements, this means that the object may also be arranged in upward or downward directions on the basis of the position of one constituent element.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "accessed by" another element, one element may be "connected to", "coupled to", or "accessed by" another element via a further element although one element may be directly connected to or directly accessed by another element.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not to be interpreted as having ideal or excessively formal meanings.

In order to increase V2X communication sensitivity, the forms of the present disclosure will disclose a V2X antenna system utilizing a first antenna installed inside the vehicle and a second antenna installed outside the vehicle.

Figure 1:
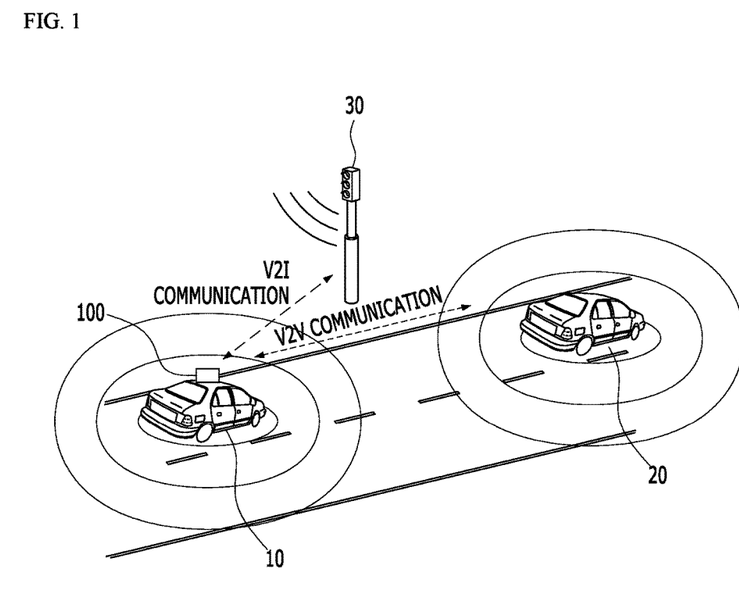
FIG. 1 is a conceptual diagram illustrating an example of a V2X communication system.

FIG. 1 is a conceptual diagram illustrating an example of a V2X communication system in some forms of the present disclosure.

In a V2X communication system in some forms of the present disclosure, the V2X antenna system 100 embedded in the vehicle 10 may connect to a counterpart vehicle 20 through V2V (Vehicle-to-Vehicle) communication, and may connect to a communication object 30 through V2I (Vehicle-to-Infrastructure) communication. Each of the vehicle 10 and the counterpart vehicle 20 may be a traveling vehicle or a stopped vehicle. Therefore, V2V communication may be achieved between the stopped or traveling vehicle 10 and the counterpart vehicle 20.

In contrast, the communication object 30 may be present as a stationary object at a predetermined position, or may be moving.

For example, if the communication object 30 is a base station (BS), V2I communication may be achieved between the traveling or stopped vehicle 10 and a base station (BS) located at a building or roadside.

Here, the vehicle 10 may perform V2V communication with the other vehicle 20, and may perform V2I communication with the communication object 30, such that V2V communication and V2I communication may be simultaneously performed.

In this case, the V2X communication system 100 embedded in the vehicle 10 may perform V2I communication with the other vehicle 20 through a first antenna embedded in the vehicle 10. In addition, the V2X antenna system 100 embedded in the vehicle 10 may perform V2I communication with the communication object 30 through a second antenna mounted on a roof of the vehicle.

As described above, the V2X antenna system 100 embedded in the vehicle 10 may construct the V2X antenna system configured to cover both an upward direction of the communication object 30 and a downward direction of the front vehicle, resulting in increased performance of V2X communication.

Figure 2:
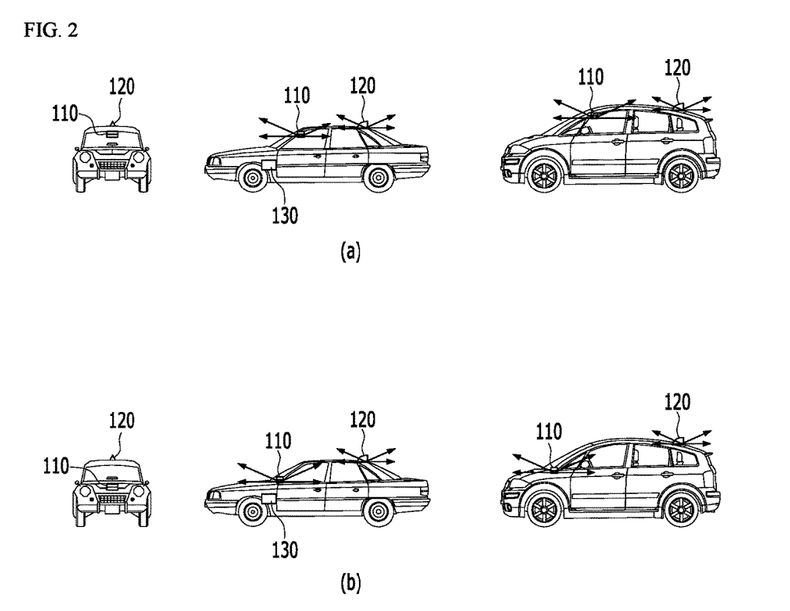
FIG. 2 is a view illustrating a V2X antenna structure.

FIG. 2 is a view illustrating a V2X antenna in some forms of the present disclosure.

Referring to FIG. 2, the V2X antenna mounted to the vehicle may include a first antenna which is arranged at a windshield to transmit/receive a V2X signal.

The first antenna may have a directional angle from −30° to 0°.

During V2X communication, the first antenna may be arranged in the vehicle so as to increase the V2X communication distance.

During V2I communication, the first antenna may be arranged at a position where the first antenna can maintain a directional communication distance even when interruption occurs by the interior and roof of the vehicle.

During V2V communication, the first antenna may be arranged at a position where noise interference generated from the interior of the vehicle is optimized such that antenna performance can be maximized.

The first antenna may be arranged in at least one of a windshield and a crash pad of the vehicle.

The V2X antenna mounted to the vehicle may include a second antenna which is arranged at a rear surface of the vehicle roof to transmit/receive a V2X signal.

The second antenna may have a directional angle from −0° to 60°.

The second antenna may include at least one of a shark-fin antenna and a micro-pole antenna.

The first antenna and the second antenna may be arranged at various positions where various directional patterns can be formed. For example, the first antenna and the second antenna may be located at the front or rear of the vehicle, and may be located at the upper or lower end of the vehicle.

The vehicle types may be classified into sedan, Sport Utility Vehicle (SUV), etc.

In order to implement V2X communication of the vehicle, it is desirable to select the position of the antenna which may be appropriate for V2X communication. According to the vehicle types, the first antenna embedded in the vehicle and the second antenna installed outside the vehicle may be used, and directivity of the first antenna embedded in the vehicle and directivity of the second antenna may be denoted by arrows.

In addition, the respective vehicles may have different V2X communication distances because they are classified into different vehicle types (e.g., sedan, SUV, etc.). Therefore, the first antenna may be arranged in at least one of the windshield and the crash pad according to vehicle type.

Referring to FIG. 2(*a*), the first antenna may be mounted to the windshield of the vehicle. The first antenna 110 may be a box-shaped antenna.

For example, if the vehicle is a sedan, the first antenna 110 may have a predetermined directional angle and may be located at the windshield of the vehicle.

For example, the first antenna 110 may be arranged at a position where the first antenna 110 can maintain a directional communication distance even when interruption occurs due to the interior and roof of the vehicle. The first antenna 110 may have the same overall longitudinal direction as the second antenna.

For example, in order to allow the first antenna to be arranged at the position where the first antenna can maintain the directional communication distance even when interruption occurs due to the interior and roof of the vehicle, the first antenna may be arranged at the widthwise center of the vehicle.

The first antenna may be arranged at a position where various patterns needed for communication of a front-upper-directional signal, a front-lower-directional signal, and a rear-lower-directional signal are formed.

The second antenna may be arranged at the rear surface of the vehicle roof. The second antenna 120 may be a roof-shaped antenna.

Referring to FIG. 2(*b*), the first antenna may be arranged in the crash pad. The first antenna 110 may be a box-shaped antenna.

For example, if the vehicle is a Sport Utility Vehicle (SUV), the first antenna 110 may have a predetermined directional angle and may be located at the crash pad.

For example, the first antenna 110 may be arranged at a position where the first antenna 110 can maintain a directional communication distance even when interruption occurs due to the interior and roof of the vehicle. The first antenna 110 may have the same overall longitudinal direction as the second antenna.

For example, in order to allow the first antenna to be arranged at the position where the first antenna can maintain the directional communication distance even when interruption occurs due to the interior and roof of the vehicle, the first antenna may be arranged at the widthwise center of the vehicle.

The first antenna may be arranged at a position where various patterns needed for communication of a front-upper-directional signal, a front-lower-directional signal, and a rear-lower-directional signal are formed.

The second antenna may be arranged at the rear surface of the vehicle roof. The second antenna 120 may be a roof-shaped antenna.

Figure 3:
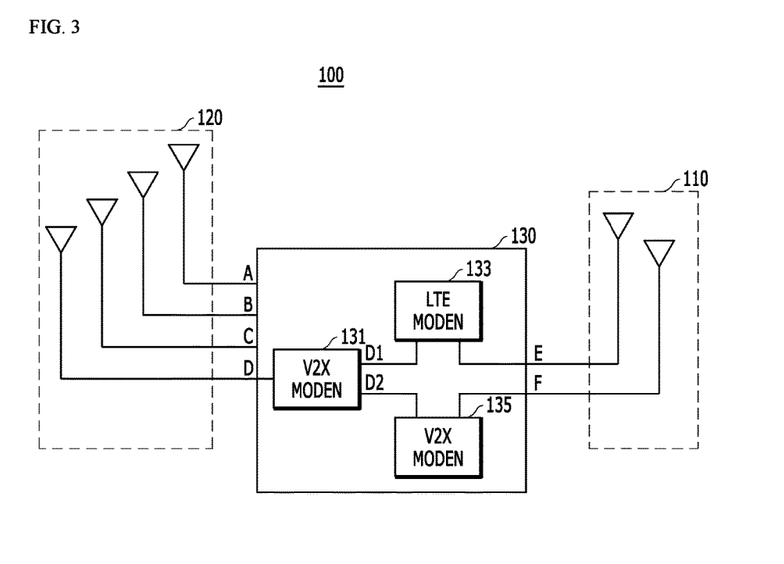
FIG. 3 is a block diagram illustrating a V2X antenna structure.

FIG. 3 is a block diagram illustrating a V2X antenna structure in some forms of the present disclosure.

Referring to FIG. 3, the V2X antenna system 200 may include a first antenna 110 disposed at a windshield to transmit/receive a V2X signal; a second antenna 120 disposed at the rear surface of the vehicle roof to transmit/receive a V2X signal; and a tuner module configured to perform diversity communication upon receiving the V2X signal from the first antenna and the second antenna 120.

Communication signals of the first antenna 110 and the second antenna 120 may be received in different ways according to regional situations. The communication signals of the first antenna 110 and the second antenna 120 for each region are shown in the following Table 1.

TABLE 1

| Categories | Domestic Band | European Band | North American Band | Chinese Band |
|---|---|---|---|---|
| A | AM, FM | AM, FM | AM, FM | AM, FM |
| B | DMB | DAB | SXM | CMMB |
| C | GPS | GNSS | GPS | GNSS |
| D1 | LTE 1(Primary) | eCall 1(Primary) | LTE 2(Secondary) | TMU(GSM) |
| D2 | V2X 1(Diversity) | V2X 1(Diversity) | V2X 1(Diversity) | V2X 1(Diversity) |
| E | LTE 2(Secondary) | eCall2(Secondary) | LTE 1(Primary) | x |
| F | V2X 2(Diversity) | V2X 2(Diversity) | V2X 2(Diversity) | V2X 2(Diversity) |

The first antenna 110 may receive LTE and V2X signals. The first antenna 110 may have directivity capable of covering signals generated from the front region of the vehicle, such that the first antenna 110 may communicate with the external part of the vehicle through wireless communication.

The second antenna 120 may receive LTE and V2X signals. The second antenna 120 may have directivity capable of covering signals generated from the rear region of the vehicle, such that the second antenna 120 may communicate with the external part of the vehicle through wireless communication. In this case, AM (Amplitude Modulation)/FM (frequency modulation) signal, a Digital Multimedia Broadcasting (DMB) signal, and a Global Positioning System (GPS) signal, each of which has a relatively high frequency, may be received only through the second antenna.

The tuner module may include a splitter for identifying a signal of the second antenna 120, an LTE modem for receiving an LTE signal from among reception signals of the first and second antennas 110 and 120; and a V2X modem for receiving a V2X signal from among reception signals of the first and second antennas 110 and 120.

For example, if the LTE signal and the V2X signal are simultaneously received by the second antenna 120, the splitter may make a distinction between the LTE signal and the V2X signal so that the splitter may output the LTE signal to the LTE modem and may output the V2X signal to the V2X modem.

The LTE modem may receive LTE (Long Term Evolution), LTE-A (Long Term Evolution-Advanced), etc. signals from the first antenna 110 and the second antenna 120. The LTE modem may be a module for accessing the Internet.

The V2X modem may be a module for wireless communication among the vehicle 10, the communication object 30, and the other vehicle 20 or a pedestrian (Vehicle-to-Pedestrian: V2P).

The tuner module may transmit and receive signals through the first antenna 110 and the second antenna 120.

The tuner module may perform diversity communication so as to reduce influence caused by fading such as irregular variation of communication electric fields of the first antenna 110 and the second antenna 120.

The tuner module may select a signal having a high reception rate from among V2X signals respectively received from the first antenna 110 and the second antenna 120.

If the first antenna is mounted to the windshield of the vehicle and performs V2V communication with the peripheral vehicle, the tuner module may select a signal having a high reception rate from among V2V signals respectively received from the first antenna 110 and the second antenna 120.

If the first antenna 110 is mounted to the windshield of the vehicle and performs V2I communication with the peripheral vehicle, the tuner module may select a signal having a high reception rate from among V2I signals respectively received from the first antenna 110 and the second antenna 120.

If the first antenna 110 is arranged at the crash pad and performs V2V communication with the peripheral vehicle, the tuner module may select a signal having a high reception rate from among V2V signals respectively received from the first antenna 110 and the second antenna 120.

The tuner module may determine in real time the reception rates of the LTE and V2X signals from the first antenna and the reception rates of the LTE and V2X signals from the second antenna. As a result, the tuner module may adjust the directional angles of the first and second antennas to a direction having the highest reception rate.

In this case, the directional angles of the first and second antennas may be independently adjusted. If the tuner module adjusts the directional angle of any one of the first and second antennas to the direction having a high reception rate of the V2X signal, the directional angle of the other antenna may be adjusted to the direction capable of widely covering the remaining parts.

For example, if the tuner module adjusts the directional angle, the directional angle of the first antenna and the directional angle of the second antenna may be changed in opposite directions.

Figure 4:
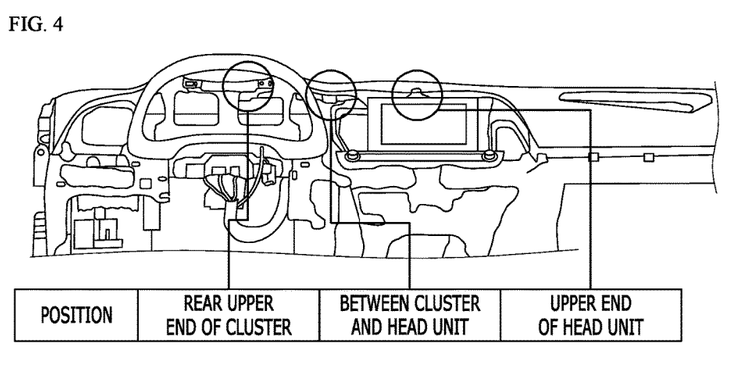
FIG. 4 is a view illustrating antennas mounted to a windshield of a vehicle.

FIG. 4 is a view illustrating antennas mounted to the windshield of the vehicle in some forms of the present disclosure.

Referring to FIG. 4, the first antenna 110 disposed in the vehicle may be disposed at a position where different shapes of metals located in a peripheral region and noise interference can be optimized and performance of the first antenna 110 can be maximized. The first antenna 110 may be mounted to the windshield of the vehicle.

For example, the first antenna 110 may be mounted to a rear upper end of a cluster. For example, the first antenna 110 may be disposed between the cluster and a head unit. For example, the first antenna 110 may be arranged at an upper end of the head unit.

Figure 5:
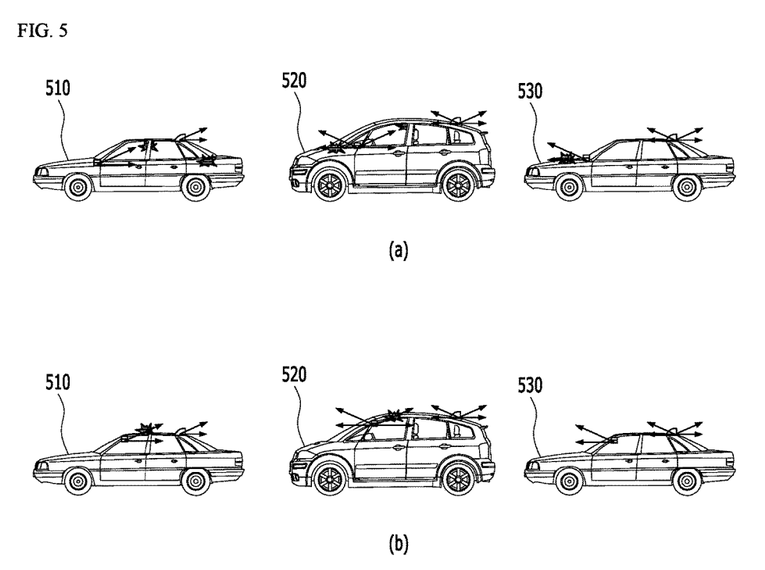
FIG. 5 is a conceptual diagram illustrating V2V communication between various kinds of vehicles.

FIG. 5 is a conceptual diagram illustrating V2V communication between various kinds of vehicles in some forms of the present disclosure.

Referring to FIG. 5, the antennas need to be arranged at positions appropriate for V2V communication. A roof antenna (i.e., outdoor antenna) is located outside the vehicle, and a box-shaped antenna (i.e., indoor antenna) is located inside the vehicle. Signal transmission patterns of the indoor and outdoor antennas are denoted by arrows.

Various types of vehicles may have different V2V communication distances. In order to address this issue, the first antenna is mounted to the windshield or the crash pad of the vehicle, resulting in implementation of V2V communication.

FIG. 5(a) exemplarily illustrates V2V communication of a vehicle in which a first antenna is mounted to the crash pad embedded in the vehicle.

If a first vehicle 510 performs V2V communication with a second vehicle 520 located in a rear region of the first vehicle 510, a rear-upper-directional signal generated from the first antenna of the first vehicle 510 may be interrupted by the roof of the first vehicle 510. In addition, the rear-lower-directional signal generated from the first antenna of the first vehicle 510 may be interrupted by the interior of the first vehicle 510. Therefore, the second vehicle 520 may not receive the output signal of the first antenna of the first vehicle 510.

The second antenna of the first vehicle 510 may output the rear-lower-directional signal and the rear-upper-directional signal to the second vehicle 520 located in the rear region of the first vehicle 510. Therefore, the second vehicle 520 may receive the output signal of the second antenna of the first vehicle 510.

Therefore, the first vehicle 510 may perform V2V communication with the second vehicle 520 through the second antenna of the first vehicle 510.

If the second vehicle 520 performs V2V communication with the first vehicle 510 acting as the front vehicle, the front-lower-directional signal generated from the first antenna of the second vehicle 520 may be interrupted by the interior of the second vehicle 520. In addition, the front-upper-directional signal generated from the first antenna of the second vehicle 520 may be output to the first vehicle 510. Therefore, the first vehicle 510 may receive the output signal of the first antenna of the second vehicle 520.

The second antenna of the second vehicle 520 may output the front-lower-directional signal and the front-upper-directional signal to the first vehicle 510 acting as the front vehicle. Therefore, the first vehicle 510 may receive the output signal of the second antenna of the second vehicle 520.

Therefore, the second vehicle 520 may perform V2V communication with the first vehicle 510 through the first and second antennas of the second vehicle 520.

If the second vehicle 520 performs V2V communication with a third vehicle 520 located to the rear of the second vehicle 520, the rear-upper-directional signal generated from the first antenna of the second vehicle 520 may be interrupted by the roof of the second vehicle 520. In addition, the rear-lower-directional signal generated from the first antenna of the second antenna 520 may be output to the third vehicle 530. Therefore, the third vehicle 520 may receive the output signal of the first antenna of the second vehicle 520.

The second antenna of the second vehicle 520 may output the front-lower-directional signal and the front-upper-directional signal to the first vehicle 510 acting as the front vehicle. Therefore, the third vehicle 530 may receive the output signal of the second antenna of the second vehicle 520.

Therefore, the second vehicle 520 may perform V2V communication with the third vehicle 530 through the first and second antennas of the second vehicle 520.

If the third vehicle 530 performs V2V communication with the second vehicle 520 located ahead of the third vehicle 520, the front-lower-directional signal generated from the first antenna of the third vehicle 530 may be interrupted by the interior of the third vehicle 530. In addition, the front-upper-directional signal generated from the first antenna of the third vehicle 530 may be output to the second vehicle 520. Therefore, the second vehicle 520 may receive the output signal of the first antenna of the third vehicle 530.

The second antenna of the third vehicle 520 may output the front-lower-directional signal and the front-upper-directional signal to the second vehicle 520 located ahead of the third vehicle 520. Therefore, the second vehicle 510 may output the output signal of the second antenna of the third vehicle 520.

As a result, the third vehicle 520 may perform V2V communication with the second vehicle 520 through the first and second antennas of the third vehicle 530.

FIG. 5(b) exemplarily illustrates V2V communication achieved by the first antenna mounted to the windshield of the vehicle.

If the first vehicle 510 performs V2V communication with the second vehicle 520 located behind the first vehicle 510, the rear-upper-directional signal generated from the first antenna of the first vehicle 510 may be interrupted by the roof of the first vehicle 510. In addition, the first antenna of the first vehicle 510 may output the rear-lower-directional signal to the second vehicle 520. Therefore, the second vehicle 520 may receive the output signal of the first antenna of the first vehicle 510.

The second antenna of the first vehicle 510 may output the rear-lower-directional signal and the rear-upper-directional signal to the second vehicle 520 located behind the first vehicle 510. Therefore, the second vehicle 520 may receive the output signal of the second antenna of the first vehicle 510.

Therefore, the first vehicle 510 may perform V2V communication with the second vehicle 520 through the second antenna of the first vehicle 510.

If the second vehicle 520 performs V2V communication with the first vehicle 510 located ahead of the second vehicle 520, the front-lower-directional signal and the front-upper-directional signal generated from the first antenna of the second vehicle 520 may be output to the first vehicle 510. Therefore, the first vehicle 510 may receive the output signal of the first antenna of the second vehicle 520.

The second antenna of the second vehicle 520 may output the front-lower-directional signal and the front-upper-directional signal to the first vehicle 510 located ahead of the second vehicle 520. Therefore, the first vehicle 510 may receive the output signal of the second antenna of the second vehicle 520.

Therefore, the second vehicle 520 may perform V2V communication with the first vehicle 510 through the first and second antennas of the second vehicle 520.

If the second vehicle 520 performs V2V communication with the third vehicle 530 located behind the second vehicle 520, the rear-upper-directional signal generated from the first antenna of the second vehicle 520 may be interrupted by the roof of the second vehicle 520. In addition, the rear-lower-directional signal generated from the first antenna of the second vehicle 520 may be output to the third vehicle 530. Therefore, the third vehicle 530 may receive the output signal of the first antenna of the second vehicle 520.

The second antenna of the second vehicle 520 may output the front-lower-directional signal and the front-upper-directional signal to the first vehicle 510 located ahead of the second vehicle 520. Therefore, the third vehicle 520 may receive the output signal of the second antenna of the second vehicle 520.

Therefore, the second vehicle 520 may perform V2V communication with the third vehicle 530 through the first and second antennas of the second vehicle 520.

If the third vehicle 520 performs V2V communication with the second vehicle 520 located ahead of the third vehicle 520, the front-lower-directional and the front-upper-directional signal generated from the first antenna of the third vehicle 520 may be output to the second vehicle 520. Therefore, the second vehicle 520 may receive the output signal of the first antenna of the third vehicle 530.

The second antenna of the third vehicle 530 may output the front-lower-directional signal and the front-upper-directional signal to the second vehicle 520 located ahead of the third vehicle 530. Therefore, the second vehicle 510 may receive the output signal of the second antenna of the third vehicle 530.

Therefore, the third vehicle 520 may perform V2V communication with the second vehicle 520 through the first and second antennas of the third vehicle 530.

Figure 6:
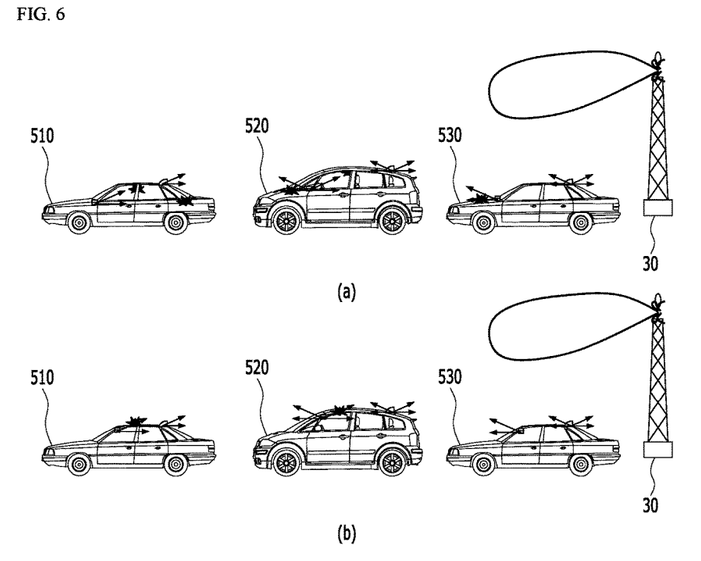
FIG. 6 is a conceptual diagram illustrating V2I communication between various kinds of vehicles.

FIG. 6 is a conceptual diagram illustrating V2I communication between various kinds of vehicles in some forms of the present disclosure.

It is desirable to select the position of the antenna which may be appropriate for V2I communication.

A roof antenna (i.e., outdoor antenna) is located outside the vehicle, and a box-shaped antenna (i.e., indoor antenna) is located inside the vehicle. Signal transmission patterns of the indoor and outdoor antennas are denoted by arrows.

Various types of vehicles may have different V2I communication distances. In order to address this issue, the first antenna is mounted to the windshield or the crash pad of the vehicle, resulting in implementation of V2I communication.

FIG. 6(*a*) exemplarily illustrates V2I communication of a vehicle in which a first antenna is mounted to the crash pad embedded in the vehicle.

If the first vehicle 510 performs V2I communication with a communication object 30 located in a rear region, a rear-upper-directional signal generated from the first antenna of the first vehicle 510 may be interrupted by the roof of the first vehicle 510. In addition, the rear-lower-directional signal generated from the first antenna of the first vehicle 510 may be interrupted by the interior of the first vehicle 510. Therefore, the communication object 30 may not receive the output signal of the first antenna of the first vehicle 510.

The second antenna of the first vehicle 510 may output the rear-lower-directional signal and the rear-upper-directional signal to the communication object 30 located in the rear region. Therefore, the communication object 30 may receive the output signal of the second antenna of the first vehicle 510.

Therefore, the first vehicle 510 may perform V2I communication with the communication object 30 through the second antenna of the first vehicle 510.

If the second vehicle 520 performs V2I communication with the communication object 30 located in the rear region, the rear-upper-directional signal generated from the first antenna of the second vehicle 520 may be interrupted by the roof of the second vehicle 520. In addition, the rear-lower-directional signal generated from the first antenna of the second vehicle 520 may be output to the communication object 30. Therefore, the communication object 30 may receive the output signal of the first antenna of the second vehicle 520.

The second antenna of the second vehicle 520 may output the rear-lower-directional signal and the rear-upper-directional signal to the communication object 30. Therefore, the communication object 30 may receive the output signal of the second antenna of the second vehicle 520.

Therefore, the second vehicle 520 may perform V2I communication with the communication object 30 through the first and second antennas of the second vehicle 520.

If the third vehicle 530 performs V2I communication with the communication object 30 located in the rear region, the second antenna of the third vehicle 530 may output the rear-lower-directional signal and the rear-upper-directional signal to the communication object 30 located in the rear region. Therefore, the communication object 30 may receive the output signal of the second antenna of the third vehicle 530.

As a result, the third vehicle 520 may perform V2I communication with the communication object 30 through the first and second antennas of the third vehicle 530.

FIG. 6(*b*) exemplarily illustrates V2V communication achieved by the first antenna mounted to the windshield of the vehicle.

If the first vehicle 510 performs V2I communication with the communication object 30 located in the rear region, the rear-upper-directional signal generated from the first antenna of the first vehicle 510 may be interrupted by the roof of the first vehicle 510. In addition, the first antenna of the first vehicle 510 may output the rear-lower-directional signal to the communication object 30. Therefore, the communication object 30 may receive the output signal of the first antenna of the first vehicle 510.

The second antenna of the first vehicle 510 may output the rear-lower-directional signal and the rear-upper-directional signal to the communication object 30 located in the rear region. Therefore, the communication object 30 may receive the output signal of the second antenna of the first vehicle 510.

Therefore, the first vehicle 510 may perform V2I communication with the communication object 30 through the second antenna of the first vehicle 510.

If the second vehicle 520 performs V2I communication with the communication object 30 located in the rear region, the rear-upper-directional signal generated from the first antenna of the second vehicle 520 may be interrupted by the roof of the second vehicle 520. In addition, the rear-lower-directional signal generated from the first antenna of the second vehicle 520 may be output to the communication object 30. Therefore, the communication object 30 may receive the output signal of the first antenna of the second vehicle 520.

The second antenna of the second vehicle 520 may output the rear-lower-directional signal and the rear-upper-directional signal to the communication object 30 located in the rear region. Therefore, the communication object 30 may receive the output signal of the second antenna of the second vehicle 520.

Therefore, the second vehicle 520 may perform V2I communication with the communication object 30 through the first and second antennas of the second vehicle 520.

If the third vehicle 530 performs V2I communication with the communication object 30 located in the rear region, the second antenna of the third vehicle 530 may output the rear-lower-directional signal and the rear-upper-directional signal to the communication object 30. Therefore, the communication object 30 may receive the output signal of the second antenna of the third vehicle 530.

Therefore, the third vehicle 530 may perform V2I communication with the communication object 30 through the first and second antennas of the third vehicle 530.

As is apparent from the above description, the effects of the V2X antenna and the V2X antenna system including the same in some forms of the present disclosure are as follows.

First, some forms of the present disclosure may be less affected by fading such as irregular variation of a communication electric field in a wireless propagation environment during V2X communication.

Second, some forms of the present disclosure can also be applied to a conventional broadcast communication and multimedia system without any difficulties. This may result in the antennas with less problems between the inventive system and the conventional system.

The method in some forms of the present disclosure may be manufactured as a program that can be executed by a computer and may be stored in recording media readable by the computer. Examples of the recording media readable by the computer may include a read only memory (ROM), a random access memory (RAM), a compact disc read only memory (CD-ROM), a magnetic tape, a floppy disk, and an optical data storage device. The recording media readable by the computer may be distributed to computer systems connected to each other through a network such that code readable by the computer is stored or executed in a distributed manner. In addition, a functional program, code, and code segments for embodying the above method may be generated by programmers in the art to which the disclosure pertains.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A V2X (Vehicle-to-Everything) antenna comprising:
a first antenna arranged in a front surface of an interior of a vehicle, wherein the first antenna is configured to communicate at least one of a V2X signal or an LTE (Long Term Evolution) signal; and
a second antenna arranged in a rear surface of a roof of the vehicle, wherein the second antenna is configured to communicate at least one of the V2X signal or the LTE signal,
wherein a directivity of the first antenna is different from a directivity of the second antenna, and the directivity of the first antenna is dualized.

2. The V2X antenna of claim 1, wherein the second antenna is configured to receive at least one of an AM(Amplitude Modulation)/FM(frequency modulation) signal, a Digital Multimedia Broadcasting (DMB) signal, or a Global Positioning System (GPS) signal.

3. The V2X antenna of claim 1, wherein the first antenna has directivity and is configured to cover a signal generated from a front region of the vehicle.

4. The V2X antenna of claim 1, wherein:
when the first antenna transmits at least one of the V2X signal or the LTE signal, the first antenna has a directional angle formed in an upward direction and in a parallel direction of the vehicle.

5. The V2X antenna of claim 4, wherein the first antenna has a directional angle of −30° to 0°.

6. The V2X antenna of claim 1, wherein the second antenna has directivity and is configured to cover a signal generated from a rear region of the vehicle.

7. The V2X antenna of claim 6, wherein:
when the second antenna transmits at least one of the V2X signal or the LTE signal, the second antenna has a directional angle formed in the upward direction and in the parallel direction of the vehicle.

8. The V2X antenna of claim 7, wherein the second antenna has a directional angle of 0° to −60°.

9. The V2X antenna of claim 1, wherein the first antenna is arranged on at least one of a windshield or a crash pad of the vehicle.

10. The V2X antenna of claim 9, wherein:
when the vehicle is a sedan, the first antenna has a predetermined directional angle and is arranged on the windshield of the vehicle.

11. The V2X antenna of claim 9, wherein:
when the first antenna is arranged on the windshield of the vehicle, the directivity of the first antenna comprises a front-upper direction, a front-parallel direction, and a rear-parallel direction.

12. The V2X antenna of claim 9, wherein the windshield comprises a position of at least one of a rear upper end of a cluster of the vehicle, a part disposed between the cluster and a head unit, or an upper end of the head unit.

13. The V2X antenna of claim 9, wherein:
when the vehicle is a Sport Utility Vehicle (SUV), the first antenna has a predetermined directional angle and is arranged on the crash pad of the vehicle.

14. The V2X antenna of claim 9, wherein:
when the first antenna is arranged on the crash pad of the vehicle, the directivity of the first antenna comprises the front-upper direction, the front-parallel direction, and the rear-parallel direction.

15. The V2X antenna of claim 10, wherein the second antenna comprises at least one of a shark-fin antenna or a micro-pole antenna.

16. A V2X (Vehicle-to-Everything) antenna system comprising:
a first antenna arranged in a front surface of an interior of a vehicle, wherein the first antenna is configured to communicate at least one of a V2X signal or an LTE (Long Term Evolution) signal;
a second antenna arranged in a rear surface of a roof of the vehicle, wherein the second antenna is configured to communicate at least one of the V2X signal or the LTE signal; and
a tuner module configured to perform diversity communication in response to at least one of the V2X signal or the LTE signal received from the first antenna and the second antenna,
wherein the tuner module further comprises:
a splitter configured to distinguish between reception signals of the first antenna and the second antenna;
an LTE modem configured to receive the LTE signal from the reception signals of the first antenna and the second antenna; and
a V2X modem configured to receive the V2X signal from the reception signals of the first antenna and the second antenna.

17. The V2X antenna system of claim 16, wherein the tuner module is configured to determine reception rates of the LTE and V2X signals of the first antenna and the reception rates of the LTE and V2X signals of the second antenna on a real time basis.

18. The V2X antenna system of claim 17, wherein the tuner module is configured to adjust a directional angle of at least one of the first antenna or the second antenna to a direction having the highest reception rate of the LTE signal and the V2X signal.

19. The V2X antenna system of claim 18, wherein:
when a directional angle of any one of the first antenna or the second antenna is adjusted in the direction having the high reception rate of the LTE signal and the V2X signal, a directional angle of the other antenna is adjusted in a direction having a wide coverage of the remaining parts.

20. The V2X antenna system of claim 19, wherein the tuner module is configured to independently adjust the directional angle of each of the first antenna and the second antenna.

21. The V2X antenna system of claim 17, wherein:
when the first antenna is arranged on at least one of a windshield or a crash pad of the vehicle, the tuner module is configured to perform diversity communication in response to the LTE signal and the V2X signal.

22. The V2X antenna system of claim 21, wherein:
when the first antenna is arranged on the windshield of the vehicle and the first and second antennas perform Vehicle-to-Vehicle (V2V) communication, the tuner module is configured to select a signal having a higher reception rate from V2V signals respectively received from the first antenna and the second antenna.

23. The V2X antenna system of claim 21, wherein:
when the first antenna is arranged in the vicinity of the windshield and performs Vehicle-to-Infrastructure (V2I) communication with a peripheral vehicle, the tuner module is configured to select a signal having a higher reception rate from V2I signals respectively received from the first antenna and the second antenna.

24. The V2X antenna system of claim 21, wherein:
when the first antenna is arranged on the crash pad of the vehicle and performs Vehicle-to-Vehicle (V2V) communication with a peripheral vehicle, the tuner module is configured to select the signal having the higher reception rate from the V2V signals respectively received from the first antenna and the second antenna.

25. The V2X antenna system of claim 21, wherein:
when the first antenna is arranged on the crash pad of the vehicle and performs Vehicle-to-Infrastructure (V2I) communication with the peripheral vehicle, the tuner module is configured to select the signal having the higher reception rate from the V2I signals respectively received from the first antenna and the second antenna.

* * * * *